United States Patent [19]
Booth

[11] 3,774,690
[45] Nov. 27, 1973

[54] GROUND MARKING MACHINE

[76] Inventor: Edwin F. Booth, Rt. 1, Mosca, Colo. 81146

[22] Filed: Jan. 17, 1972

[21] Appl. No.: 218,126

[52] U.S. Cl.................. 172/126, 172/741, 172/677
[51] Int. Cl....................... A01b 17/00, A01b 25/00
[58] Field of Search.................... 172/126–132, 311

[56] References Cited
UNITED STATES PATENTS

| | | | |
|---|---|---|---|
| 1,403,908 | 1/1922 | Mineart et al. | 172/130 |
| 1,917,733 | 7/1933 | Psikal et al. | 172/126 |
| 1,932,107 | 10/1933 | Hipple | 172/126 |
| 2,073,879 | 3/1937 | Ritchie | 172/132 |
| 2,130,512 | 9/1938 | Silver | 172/126 X |
| 2,225,204 | 12/1940 | Benjamin | 172/126 X |
| 2,725,814 | 12/1955 | Watmough | 172/126 |
| 2,827,843 | 3/1958 | Tea | 172/128 |
| 2,828,597 | 4/1958 | Moore | 172/311 X |
| 3,523,699 | 8/1970 | Sinkule et al. | 172/311 X |
| 3,669,195 | 6/1972 | Green et al. | 172/126 X |

*Primary Examiner*—Robert E. Pulfrey
*Assistant Examiner*—Paul T. Sewell
*Attorney*—Bertha L. MacGregor

[57] ABSTRACT

A ground marking machine for making marks on the ground to indicate the location of furrows or windrows for planting purposes, comprising ground marking apparatus detachably and pivotally connected to the rear of a power operated vehicle in either operative or transport positions. The marking apparatus comprises a swivel-wheeled carriage on the outer end of a beam which comprises telescopically mounted members. The marking apparatus extends sidewise from the vehicle and includes means for maintaining the beam at right angles to the direction of travel of the vehicle at either side of the vehicle. The apparatus also includes optionally usable means for making a windrow or additional row of marks parallel to another row at selected distance therefrom.

3 Claims, 7 Drawing Figures

PATENTED NOV 27 1973  3,774,690
SHEET 1 OF 2
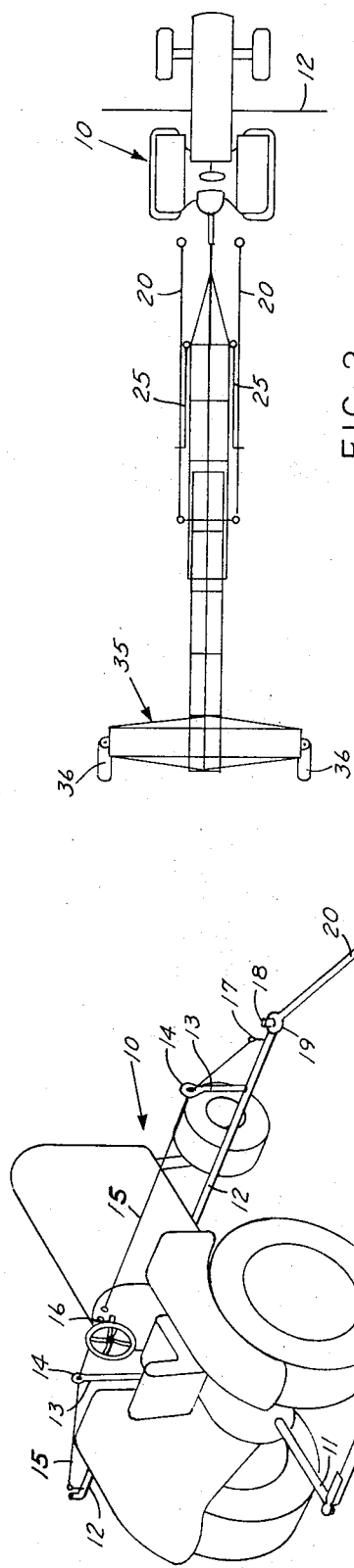
FIG. 2
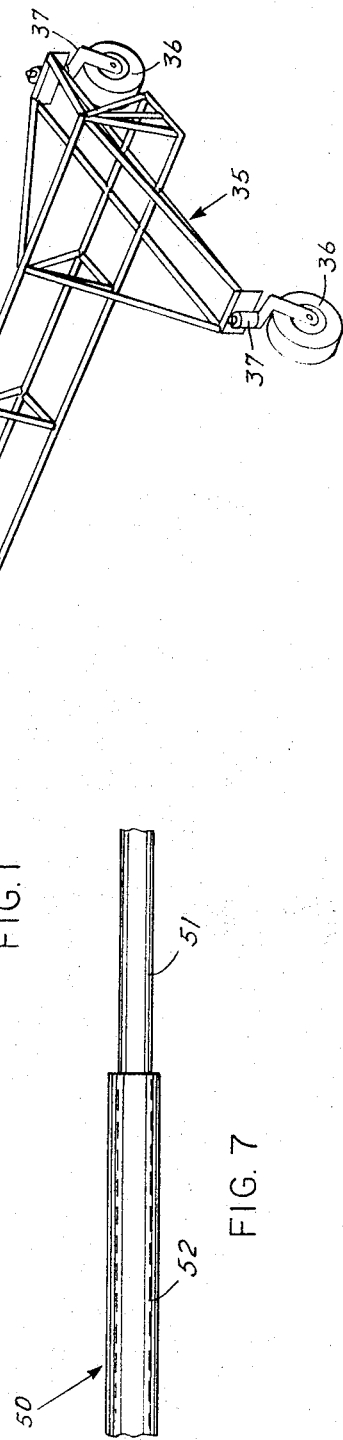
FIG. 1
FIG. 7

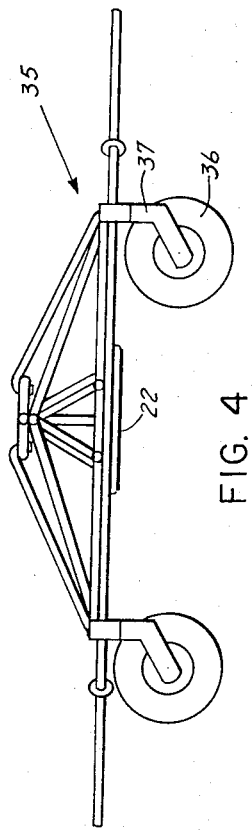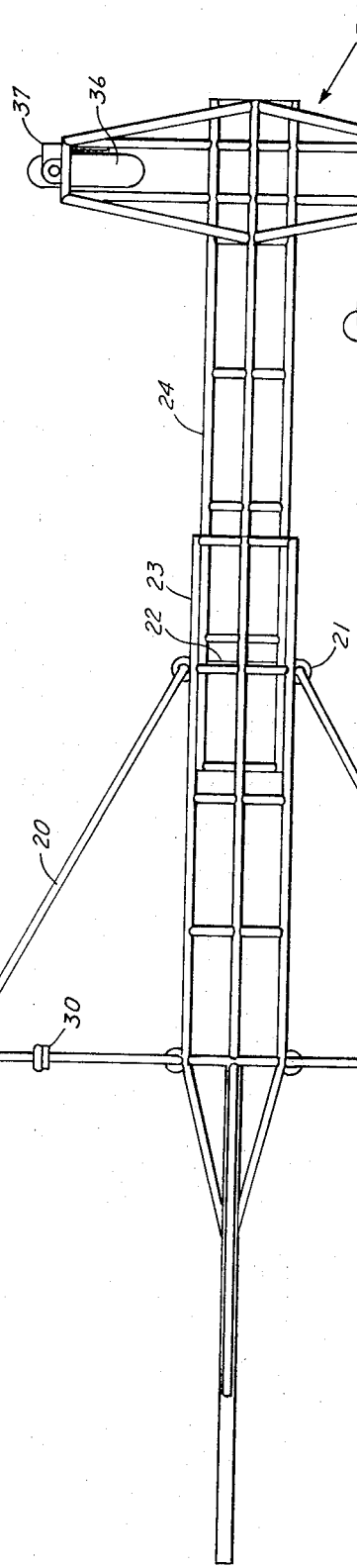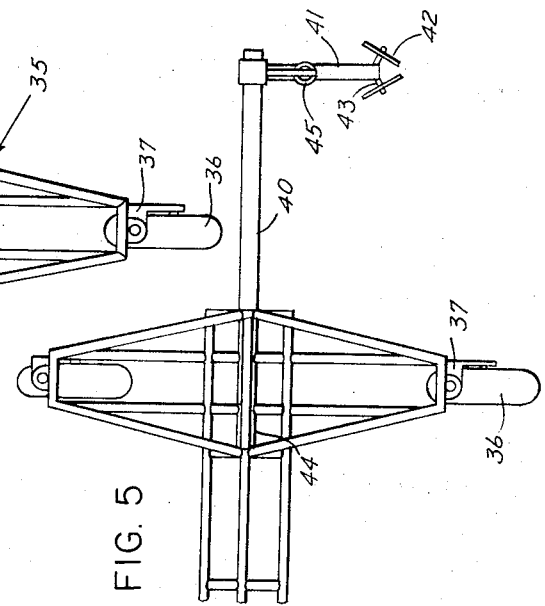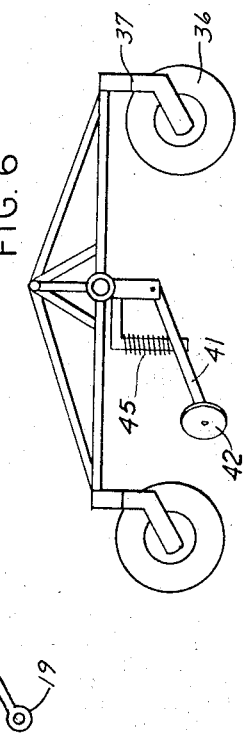
FIG. 3
FIG. 4
FIG. 5
FIG. 6

GROUND MARKING MACHINE

This invention relates to a ground marking machine for agricultural purposes such as making marks on the ground to indicate the location of furrows or windrows.

The main object of the invention is to provide adjustable apparatus whereby the ground may be marked to indicate rows located at selected distances from the power driven vehicle, such as a tractor, to which the apparatus is fastened.

Another object is to provide means for attaching the marker apparatus to a tractor or other vehicle for making marks parallel to the direction of movement of the vehicle at either side of the vehicle.

Another object of the invention is to provide pivotally mounted attaching means between the tractor and the marking apparatus that permits easy turning of the vehicle and apparatus at the end of the rows being marked on the ground.

Another object is to provide an attachment that may be fastened to the ground marking apparatus for the purpose of making a furrow or windrow located in a row parallel to another row.

Another object is to provide ground marking apparatus which can be towed by the vehicle to which it is attached to travel in alignment with the vehicle and within the area defined by the width of the vehicle.

In the drawings:

FIG. 1 is a perspective view of a tractor showing my ground marking apparatus hitched to the rear of a tractor and detachably fastened to one end of a rigid cross bar mounted on the forward end of the tractor, with the telescopically constructed beam, triangular in cross section, in its extended position, and the swivel-wheeled carriage mounted on the outer end of the telescopic beam.

FIG. 2 is a diagrammatic top plan view of a tractor and the ground marking apparatus in transport positions.

FIG. 3 is a top plan view, on an enlarged scale, showing the marking apparatus detached from the tractor, with the telescopic beam in partially extended position.

FIG. 4 is an elevational end view of the apparatus shown in FIG. 3.

FIG. 5 is a fragmentary top view of the wheel carriage end of the apparatus provided with an attachment for making a windrow parallel to the carriage.

FIG. 6 is an elevational end view of the carriage and attachment shown in FIG. 5.

FIG. 7 is a fragmentary plan view showing a modified form of telescopic beam.

In the embodiment of the invention shown in the drawings, 10 designates a tractor or other power operated vehicle, as a whole, on which the ground marker apparatus is pivotally mounted. The tractor is provided with a rear hitch 11, and a cross bar 12 which is rigidly mounted on the under side of the tractor engine housing to provide arms extending in opposite directions transversely of the direction of movement of the tractor. Each arm of the cross bar 12 has an upright support 13 thereon, near its outer end, and each support 13 terminates in an eyelet or loop 14 at its upper end. Two lengths of cable 15 are fastened to a fixed part of the vehicle 10 near the steering column 16 and each extends through an eyelet 14 and is fastened to a loop 17 on a hook 18 pivotally mounted on the end of the cross bar 12.

Each of the pivotally mounted hooks 18 engages an eyelet 19 on the end of a tie rod 20. Two tie rods 20 are provided, each pivotally connected at 21 to a cross piece 22. The cross piece 22 is rigidly mounted on the outer member 23 of a telescoping beam whose inner member is designated 24. In the embodiment of the invention shown in FIGS. 1–3, the telescoping beam is triangular in cross section.

A cross support 25 extends sidewise of the beam 23, 24, when the apparatus is in its operative position, but is pivotally mounted so that its arms can be moved from the position shown in FIG. 1 to the transport position of FIG. 2. The cross support 25 has an eyelet or loop 26 on each of its outer ends in which the tie rods 20 are slidable when the cross support arms are folded into the inoperative position of the apparatus. The eyelets 26 on cross support 25 serve to support the rods 20 in their operative positions and also permit the rods 20 to be moved toward the side of the beam when the marker apparatus is being towed or when one of the tie rods 20 is not in use. The cross support 25 is braced by brace rods 27 each pivotally connected at one end as indicated at 32 to a short fixed member 28 located adjacent the inclined center rod 29. The brace rods 27 have limited sliding movement at the loop end 31 on the cross support 25 between the eyelet 26 and a fixed stop 30 on the support arms. The inner end of the beam 23 including the inclined rod 29 are connected to a horizontal shaft which is detachably and pivotally mounted in the hitch 11 of the tractor 10.

The inner beam member 24 is slidable in the outer member 23 to extend or retract the member 24. Fixedly secured to the outer end of the inner member 24 is a swivel-wheel carriage 35 comprising a frame of any suitable form extending transversely of the beam 24 and parallel to the longitudinal dimension of the tractor 10 when the marker is in operative position. Two marker wheels 36 are mounted on swivel mounting means 37 which are rotatable in opposite ends of the carriage 35 so that the wheels are in tandem positions to make longitudinal row marks parallel to the direction of travel of the tractor or may be in a position wherein the wheels have turned 90° and extend transversely of the carriage 35 as in the transport position of FIG. 2.

As shown in FIG. 5, a shaft 40 is slidably mounted in a sleeve 44 fixedly mounted in the beam member 24 and may be withdrawn to extend outwardly beyond the wheel carriage 35. A vertical shaft 41 is connected to the outer end of the shaft 40 by any suitable means. A pair of small wheels 42 are mounted on inclined axles 43 so that the proximate faces of the wheels are downwardly convergent. A spring 45 exerts pressure on the wheels mounting 41 as shown in FIGS. 5 and 6 to urge the wheels 42 into windrow forming contact with the ground.

The modification shown in FIG. 7 consists of a simple tubular beam 50 having an inner shaft 51 slidable in the hollow pipe 52 whereby the position of the wheel carriage can be adjusted to bring the wheels 36 into selected position for marking the location of a row. This telescopic construction may replace the beam 23, 24, wherein the members are triangular in cross section. I claim:

1. A ground marking machine comprising
   a. a driven vehicle having a rearwardly extending hitch, b. a pair of cross bars extending sidewise in opposite directions from the vehicle forwardly of the hitch, c. a beam consisting of two telescoping members one of which is detachably and pivotally connected at one end to the hitch of the vehicle to extend sidewise of the vehicle in its operative position and in longitudinal alignment with the vehicle in transport position, d. a carriage mounted on the other of said beam members, said carriage having swivel mounted wheels movable to tandem or axially aligned positions, e. two tie rods each pivotally connected at one end to one of the beam members and at its other end to one of the rigid arms on the vehicle, movable to positions parallel and adjacent to the beam when detached from the rigid arm, f. two lengths of cable fastened to a fixed part of the vehicle, each cable extending through an eyelet and fastened to a hook mounted on the end of a cross bar, and g. a cross support comprising a central piece fixedly mounted on one of the beam members and cross support arms pivotally connected to the central piece, each of said cross support arms terminating in an eyelet through which one of the tie rods is slidable when said arms and tie rods are moved from sidewise extending positions to positions parallel to the beam, whereby the beam and carriage can be swung about the pivotal connection between the beam and hitch to either side of the vehicle when the tie rods are disconnected from the rigid vehicle arms.

2. The machine defined by claim 1 in which the cross bars are an integral bar fastened to the under side of the vehicle body to extend sidewise in opposite directions beyond said vehicle body.

3. The machine defined by claim 1 which includes an attachment for marking a row parallel to the row marked by the carriage wheels, comprising a holder sleeve fastened to one of the beam members, a horizontal shaft slidable in the holder sleeve, a vertical shaft connected to the horizontal shaft, a pair of wheel axles and wheels having proximate faces downwardly convergent and attached to the lower portion of said vertical shaft.

* * * * *